(12) United States Patent
Sung (10) Patent No.: US 8,873,865 B2
(45) Date of Patent: Oct. 28, 2014

(54) ALGORITHM FOR FAST CORNER DETECTION

(75) Inventor: Chiachi Sung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 91 days.

(21) Appl. No.: 13/420,223

(22) Filed: Mar. 14, 2012

(65) Prior Publication Data

US 2013/0089261 A1    Apr. 11, 2013

Related U.S. Application Data

(60) Provisional application No. 61/545,526, filed on Oct. 10, 2011.

(51) Int. Cl.
*G06K 9/48* (2006.01)
*G06K 9/46* (2006.01)

(52) U.S. Cl.
CPC .................................. *G06K 9/4604* (2013.01)
USPC ........................... 382/199; 382/221; 382/224

(58) Field of Classification Search
None
See application file for complete search history.

(56) References Cited

U.S. PATENT DOCUMENTS

| | | | |
|---|---|---|---|
| 8,040,351 B1* | 10/2011 | Diard | 345/426 |
| 2008/0060034 A1* | 3/2008 | Egnal et al. | 725/105 |
| 2010/0054593 A1 | 3/2010 | Matsushita et al. | |
| 2010/0157070 A1 | 6/2010 | Mohanty et al. | |
| 2010/0290708 A1 | 11/2010 | Magai et al. | |
| 2011/0110581 A1 | 5/2011 | Yang et al. | |
| 2011/0222774 A1 | 9/2011 | Hong et al. | |
| 2011/0285810 A1 | 11/2011 | Wagner et al. | |

OTHER PUBLICATIONS

Dorst, Leo, and Fokke Groen. "A system for the quantitative analysis of interferograms." In 1985 International Technical Symposium/Europe, pp. 155-159. International Society for Optics and Photonics, 1986.*
International Search Report and Written Opinion—PCT/US2012/051756—ISA/EPO—Mar. 11, 2013.
Kaaniche M.B., et al., "Gesture recognition by learning local motion signatures", 2010 IEEE Conference on Computer Vision and Pattern Recognition (CVPR). Jun. 13-18, 2010, San Francisco, CA, USA, IEEE, Piscataway, NJ, USA, Jun. 13, 2010, pp. 2745-2752, XP031725828, ISBN: 978-1-4244-6984-0.
Kraft M., et al., "System on Chip Coprocessors for High Speed Image Feature Detection and Matching", Aug. 22, 2011, Advances Concepts for Intelligent Vision Systems, Springer Berlin Heidelberg, Berlin, Heidelberg, pp. 599-610, XP019161128, ISBN: 978-3-642-23686-0.

(Continued)

*Primary Examiner* — Jason M Repko
*Assistant Examiner* — David Perlman
(74) *Attorney, Agent, or Firm* — Silicon Valley Patent Group LLP (57) ABSTRACT

An apparatus and method to find a specified number of corners and/or interest points in an image is presented. In some embodiments, a method to find a specified number of corners in a digital image comprises receiving a digital image containing a plurality of candidate corners; directly calculating a threshold score (S) for a center pixel, for each of the plurality of candidate corners, to form a plurality of scores; sorting, by the plurality of scores, the plurality of candidate corners to form a sorted list; and selecting corner locations sequentially from the sorted list based on the certain number of corners. The methods described may be implemented using any combination of hardware, software and firmware.

31 Claims, 9 Drawing Sheets

(56) References Cited

OTHER PUBLICATIONS

Rosten E., et al., "Faster and Better: A Machine Learning Approach to Corner Detection", Transactions on Pattern Analysis and Machine Intelligence. IEEE. Piscataway, USA, vo 1. 32. No. 1. Jan. 1, 2010, pp. 105-119, XP011321483, ISSN: 0162-8828. DOI: 10.1109/TPAMI.2008.275.

Rosten E., et al., "Machine Learning for High-Speed Corner Detection", Jan. 1, 2006, Computer Vision—ECCV 2006: 9th European Conference on Computer Vision, Graz, Austria, May 7-13, 2006; Proceedings; [Lecture Notes in Computer Science], Springer, Berlin, DE, pp. 430-443, XP019036410, ISBN: 978-3-540-33832-1.

Wagner D., et al., "Real-time panoramic mapping and tracking on mobile phones," Virtual Reality Conference (VR) 2010 IEEE, Mar. 20, 2010, pp. 211-218.

* cited by examiner

2010 receiving a digital image containing a plurality of candidate corners

2020 directly calculating a threshold score (S) with each of the plurality of candidate corners as a center pixel to form a plurality of scores

2030 sorting, by the plurality of scores, the plurality of candidate corners to form a sorted list

2040 selecting corner locations sequentially from the sorted list based on the specified number of corners

FIG. 21

ALGORITHM FOR FAST CORNER DETECTION

CROSS-REFERENCE TO RELATED APPLICATIONS

This application claims the benefit of and priority under 35 U.S.C. §119 to U.S. Provisional Patent Application No. 61/545,526, filed Oct. 10, 2011, entitled "Efficient algorithm for FAST corner detection", which is assigned to the assignee hereof and which is incorporated herein by reference in its entirety.

BACKGROUND

I. Technical Field

This disclosure relates generally to apparatus and methods for corner and/or interest point detection in images, and more particularly to a method to determine the number of corners and/or interest points in an image.

II. Background

The Features from Accelerated Segment Test ("FAST") algorithm is a commonly used method of finding corners in an image in computer vision systems. Corners are points where two or more edges intersect or whose immediate neighborhood includes two or more dominant edges with different directions. In general, algorithms such as FAST detect interest points in an image, which have well-defined positions. Therefore, while interest points may be corners, they include isolated points with a local intensity maximum or minimum. As used herein, the term corner encompasses interest points.

The FAST algorithm is publically available as code from Edward Rosten, Tom Drummond and Los Alamos National Laboratory. The FAST algorithm scans through every pixel of an image in order to find pixels that represent corners. While easy to understand, the FAST algorithm requires a large number of iterative computations. Moreover, the FAST algorithm fails to scale well to a paralleled architecture, which makes it difficult to implement on an ASIC or SIMD processor.

Figure 1:
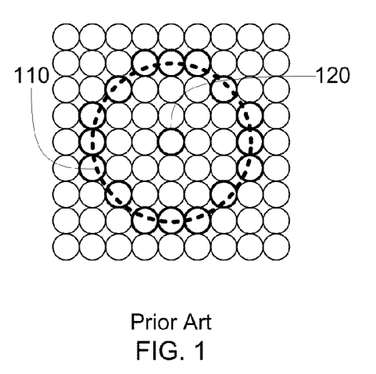
FIG. 1 shows an exemplary grid of pixels in an image including a center pixel and a ring of pixels around the center pixel.

FIG. 1 shows exemplary pixel 120 on surrounding ring 110 of M pixels. Ring 110 overlaying the pixel grid highlights the M pixels that comprise ring 110 about center pixel 120. Exemplary center pixel 120 is a corner if and only if it is brighter or darker than N consecutive pixels on surrounding ring 110 of M pixels. The values of N and M are design parameters, which are normally N=9 to 12 for M=16.

Figure 2:
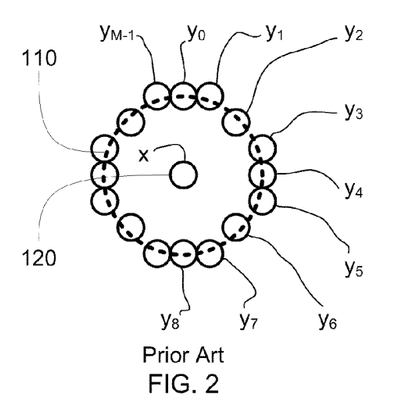
FIG. 2 shows an exemplary center pixel with intensity x and M pixels having intensity $y_0, y_1, y_2, y_3 \ldots y_{M-1}$, for M=16 in a circle around the center pixel.

FIG. 2 shows exemplary center pixel 120 with intensity x and pixels on surrounding circle 110 with various intensities $y_i$. As shown in FIG. 2, $y_i$ denotes the intensity of the pixel at position i on circle 110. Pixels are numbered sequentially i=0, 1, 2 . . . M−1, about the surrounding ring 110 and have intensities $y_1, \ldots, y_{M-1}$. A first pixel at position 0 has a first intensity $y_0$. The pixels $y_0, y_1, \ldots, y_{M-1}$ complete the surrounding ring 110 of M pixels.

Figure 3:
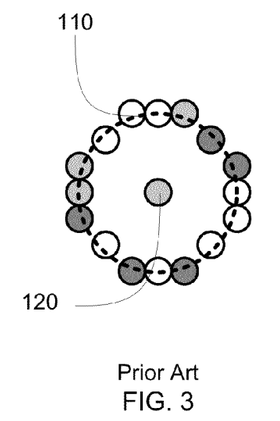
FIGS. 3 and 4 show an exemplary ring of M pixels having various intensities about a center pixel.
Figure 4:
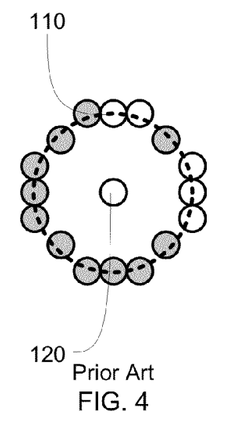

FIGS. 3 and 4 show a ring 110 of M pixels having various intensities about center pixel 120. Pixels comprising ring 110 may be computed, for example, by using well-known computer graphics techniques, such as a midpoint circle algorithm or the Bresenham's circle algorithm, which determine the points needed for drawing a circle.

More formally, let A be any set of the indexes of N consecutive pixels on the ring of M pixels. The FAST algorithm detects corners using the rule:

$$\text{center pixel} \begin{cases} \text{bright corner} & \text{if } [(x - y_i) > t, \forall i \in A, \exists A] \\ \text{dark corner} & \text{if } [(y_i - x) > t, \forall i \in A, \exists A] \\ \text{not a corner} & \text{otherwise} \end{cases} \quad (1)$$

where t is a predetermined threshold to filter out weak corners. For each detected corner pixel, the FAST algorithm defines a score, which is the maximum threshold t for the pixel to remain a corner. The score measures the "cornerness" of the pixel or the degree to which the pixel may be considered a corner relative to other pixels, and may be used to further filter out weaker corners when too many corners are found. That is, the FAST algorithm may be iteratively executed to find a threshold t that reduces a number of corners to a desired number of corners.

The FAST algorithm finds corners via a decision tree. Each tree node may be viewed as a "compare" gate that tests for either $(x-y_i) > t$ or $(y_i-x) > t$. In most cases, each tree node leads to either another tree node or a leaf node. A leaf node represents the final decision, which is either a corner is affirmed or a corner is not found at a particular center pixel. The decision tree is designed using empirical data so that the average traversal depth is minimal. After a corner is found, a binary search is performed by varying t iteratively in order to find the score threshold.

There are a few drawbacks to the above FAST algorithm. First, the computational complexity depends on the average traversal depth of the decision tree. Second, because the decision tree is designed using empirical data, it may not be optimal for all possible data sets. Third, the decision tree is a large tree, so it takes a large amount of software code space or a large number of hardware gates to implement. Fourth, when implemented in software, each tree node is mapped to a simple comparison test followed by a conditional branch, which incurs a large number of CPU cycle overhead on deeply pipelined processors. Fifth, all the inefficiencies are further compounded by the iterative nature of the algorithm, since multiple iterations mean the decision tree will be traversed more than one time.

Detecting corners is important in many computer vision applications, like motion detection, object recognition and tracking, object navigation, image stitching, 3D reconstruction, etc. The large variety of application areas make resource and time efficient implementations of corner detection methods desirable.

Therefore, a method of performing the FAST corner detection that reduces complexity and processing is desired.

SUMMARY

Disclosed is an apparatus and method for corner detection in an image. According to some aspects, a method to find a specified number of corners in a digital image, the method comprising: receiving the digital image containing a plurality of candidate corners; directly calculating a threshold score (S) for a plurality of center pixels to form a plurality of scores, wherein each center pixel corresponds to a distinct individual candidate corner in the plurality of candidate corners; sorting, by the plurality of scores, the plurality of candidate corners to form a sorted list; and selecting corner locations sequentially from the sorted list based on the specified number of corners.

According to some aspects, a device to find a certain number of corners in a digital image, the device comprising: means for receiving the digital image containing a plurality of candidate corners; means for directly calculating a threshold score (S) for a plurality of center pixels to form a plurality of scores, wherein each center pixel corresponds to a distinct individual candidate corner in the plurality of candidate corners; means for sorting, by the plurality of scores, the plurality of candidate corners to form a sorted list; and means for selecting corner locations sequentially from the sorted list based on the certain number of corners.

According to some aspects, a device comprising at least one processor and a memory wherein the memory includes software instructions for: receiving a digital image containing a plurality of candidate corners; directly calculating a threshold score (S) for a plurality of center pixels to form a plurality of scores, wherein each center pixel corresponds to a distinct individual candidate corner in the plurality of candidate corners; sorting, by the plurality of scores, the plurality of candidate corners to form a sorted list; and selecting corner locations sequentially from the sorted list based on the certain number of corners.

According to some aspects, a computer-readable medium including program code stored thereon, comprising program code for: receiving a digital image containing a plurality of candidate corners; directly calculating a threshold score (S) for a plurality of center pixels to form a plurality of scores, wherein each center pixel corresponds to a distinct individual candidate corner in the plurality of candidate corners; sorting, by the plurality of scores, the plurality of candidate corners to form a sorted list; and selecting corner locations sequentially from the sorted list based on the certain number of corners.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Embodiments disclosed exploit mathematical structure and relationships in the FAST corner detection to facilitate information sharing between computational steps, thus reducing the overall complexity of FAST corner detection, whether implemented in software or hardware.

FAST software implementations consistent with some disclosed embodiments provide for: (1) fewer processor cycles, for example, on processors implementing Single Instruction Multiple Data ("SIMD") instruction sets; (2) a lower memory footprint; and/or (3) better cache performance.

When implemented in hardware, FAST implementations, in some embodiments, provide for: (1) lower gate counts; and/or (2) lower end-to-end latency, in part, from the use of a shorter dependency chain and/or direct computation of thresholds rather than an iterative computation.

In some embodiments, a threshold score for exemplary center pixel 120, which has an intensity x, may be defined as $$S = \max(S_B, S_D) \quad (2)$$

where a brightness score is defined as $$S_B = (T_B - x - 1) \quad (3A)$$

and similarly a darkness score is defined as $$S_D = (x - T_D - 1). \quad (3B)$$

Further, where surrounding circle pixels 110 have intensities $y_0, y_1 \ldots y_{M-1}$, an absolute brightness score $T_B$ may defined as:

$$T_B = \max(\min(y_{A_0}), \min(y_{A_1}), \min(y_{A_2}), \ldots, \min(y_{A_{M-1}})) \quad (4A)$$

and an absolute darkness score $T_D$ is defined as $$T_D = \min(\max(y_{A_0}), \max(y_{A_1}), \max(y_{A_2}), \ldots, \max(y_{A_{M-1}})) \quad (4B)$$

where $A_k$ represents a set of indexes of N consecutive pixels on ring 110 starting at pixel $y_0$, for index k=0.

Figure 5:
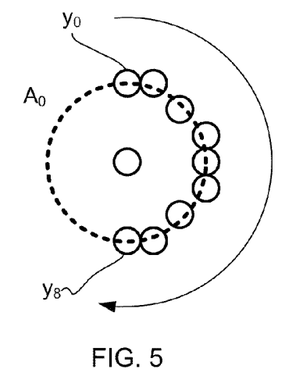
FIGS. 5 to 11 show definitions for a segment of pixels denoted as $A_i$, in accordance with some embodiments of the present invention.

FIG. 5 shows the set $A_0$, for index k=0, M=16 and N=9, which includes the segment of pixels starting at pixel $y_0$ and ending at $y_8$.

Figure 6:
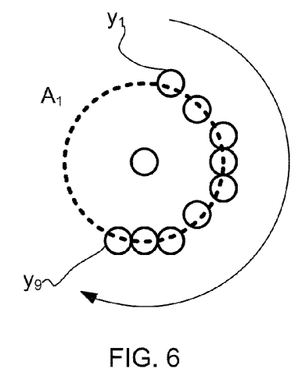
Figure 7:
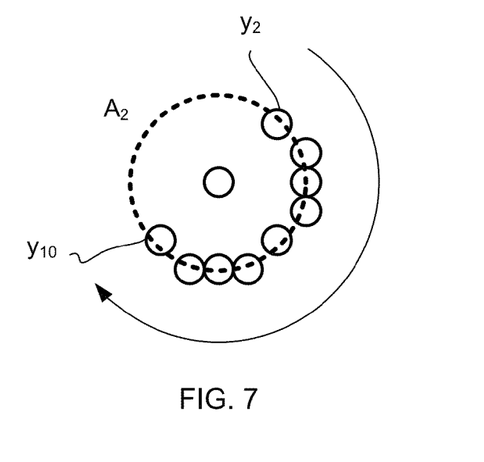
Figure 8:
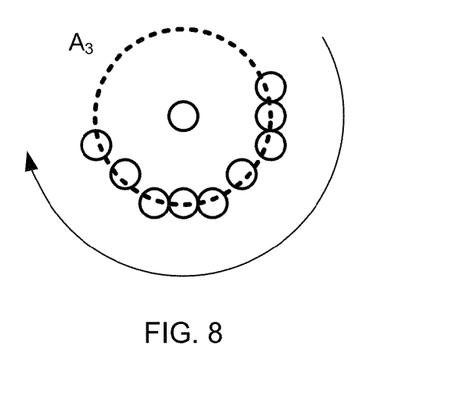
Figure 9:
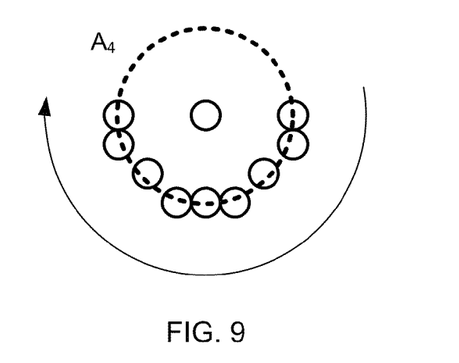
Figure 10:
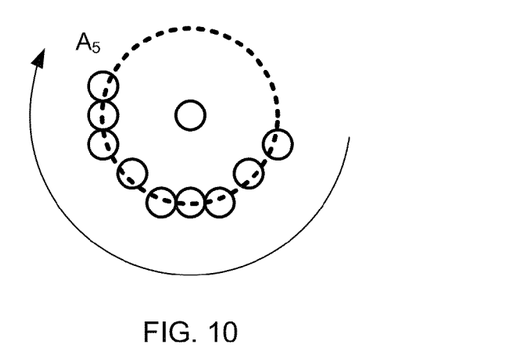
Figure 11:
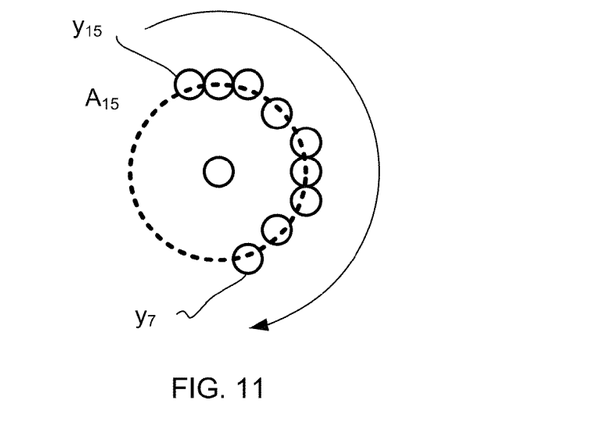

Similarly, FIG. 6 shows the set $A_1$, for index k=1, M=16 and N=9, which includes the segment of pixels starting at pixel $y_1$ and ending at $y_9$.

FIGS. 7, 8, 9, 10, and 11 show exemplary sets $A_2$, $A_3$, $A_4$, $A_5$ and $A_{15}$, for index values k=2, 3, 4, 5 and 15, respectively and for M=16 and N=9. As shown in FIGS. 7-11, the set $A_2$ includes the segment of pixels starting at pixel $y_2$ and ending at $y_{10}$; the set $A_3$ includes the segment of pixels starting at pixel $y_3$ and ending at $y_{11}$; the set $A_4$ includes the segment of pixels starting at pixel $y_4$ and ending at $y_{12}$; the set $A_5$ includes the segment of pixels starting at pixel $y_5$ and ending at $y_{13}$; and the set $A_{15}$ includes the segment of pixels starting at pixel $y_{15}$ and ending at $y_7$.

For convenience of later operations, the absolute brightness score and the absolute darkness score are rewritten in condensed form using the minimum indexes i=0 to M−1 and formulated as $$T_B = \max_{k=0}^{M-1}(\min(y_{A_k})) = \max_{k=0}^{M-1}(\min_{i=k}^{(N-1+k) \bmod M}(y_i)); \text{ and} \quad (5A\text{-}1)$$

$$T_D = \min_{k=0}^{M-1}(\max(y_{A_k})) = \min_{k=0}^{M-1}(\max_{i=k}^{(N-1+k) \bmod M}(y_i)) \quad (5B\text{-}1)$$

and letting $y_{i+M} = y_i$ or equivalently, $y_i = y_{i \bmod M}$, in simpler notation leaving off the modulo operation, the absolute brightness score and the absolute darkness score are rewritten as $$T_B = \max_{k=0}^{M-1}(\min(y_{A_k})) = \max_{k=0}^{M-1}(\min_{i=k}^{N-1+k}(y_i)); \text{ and} \quad (5A\text{-}2)$$

$$T_D = \min_{k=0}^{M-1}(\max(y_{A_k})) = \min_{k=0}^{M-1}(\max_{i=k}^{N-1+k}(y_i)). \quad (5B\text{-}2)$$

For $T_B$, the number of elements in the maximum operation is M and the number of elements in the minimum operation is N. It follows that the number of pairwise maximum compares is (M−1) and the number of pairwise minimum compares is (N−1). Therefore, to compute $T_B$ using equation (5A) takes (M−1) times (N−1) comparison operations or approximately MN for large values of M and N.

The following forward conversion and inverse conversion between a Max-Min space and a Σ-Π space is used to reduce the number of operations in equations (5A) and (5B). That is, $T_B$ is converted from Max-Min space to Σ-Π space, reduced in complexity while in Σ-Π space, and converted back to Max-Min space. For $T_B$, a forward conversion occurs where a maximum operation is converted to a summation operation (Σ) and a minimum operation is converted to a product operation (Π). Conversely, for the inverse conversion, a summation operation (Σ) is converted back to a maximum operation and a product operation (Π) is converted back to a minimum operation.

Using this forward conversion scheme, $T_B$ may be written in Σ-Π space as $$T_B = \sum_{k=0}^{M-1} \left\{ \prod_{i=k}^{N-1+k} (y_i) \right\} \quad (6)$$

directly from equation (5A-2)

$$T_B = \max_{k=0}^{M-1}(\min_{i=k}^{N-1+k}(y_i)) \quad (7)$$

The complexity of equation (6) may be represented as (M−1) sums of (N−1) products or simply as (M−1)(N−1) or approximately MN for large values of M and N. A goal is to reduce the complexity, thus reducing the number of operations. The following mathematical operations are used to show how to reduce the number of operations in Σ-Π space.

Assuming M is an even number, equation (6) is separated into even and odd terms as $$T_B = \sum_{\text{even } k=0}^{(M-1)-1} \left\{ \prod_{i=k}^{N-1+k} (y_i) \right\} + \sum_{\text{odd } k=1}^{M-1} \left\{ \prod_{i=k}^{N-1+k} (y_i) \right\} \quad (8)$$

For the even terms, k is substituted with (2k) and for the odd terms k is substituted with (2k+1) such that $$T_B = \sum_{k=0}^{\frac{(M-1)-1}{2}} \left\{ \prod_{i=2k}^{N-1+k} (y_i) \right\} + \sum_{k=0}^{\frac{(M-1)-1}{2}} \left\{ \prod_{i=2k+1}^{N-1+2k+1} (y_i) \right\} \quad (9)$$

and simplifying indexes as $$T_B = \sum_{k=0}^{\frac{(M-2)}{2}} \left\{ \prod_{i=2k}^{N-1+2k} (y_i) \right\} + \sum_{k=0}^{\frac{(M-2)}{2}} \left\{ \prod_{i=2k+1}^{N+2k} (y_i) \right\}. \quad (10)$$

Using an inverse of the distributive property to pull out the common summation operations, $T_B$ is written as $$T_B = \sum_{k=0}^{\frac{(M-2)}{2}} \left\{ \prod_{i=2k}^{N-1+2k} (y_i) \prod_{i=2k+1}^{N+2k} (y_i) \right\} \quad (11)$$

Extracting just the first or the last term from each internal product leaves us with $$T_B = \sum_{k=0}^{\frac{(M-2)}{2}} \left\{ y_{2k} \prod_{i=2k+1}^{N-1+2k} (y_i) + \prod_{i=2k+1}^{N-1+2k} (y_i) y_{N+2k} \right\}. \quad (12)$$

Now we are left with two identical product operations, which may be factored out to result in $$T_B = \sum_{k=0}^{\frac{(M-2)}{2}} \left\{ (y_{2k} + y_{N+2k}) \prod_{i=2k+1}^{N-1+2k} (y_i) \right\} \quad (13A)$$

The absolute darkness score may be computed by converting Min-Max to Σ-Π space by using similar complexity reduction techniques applied above to $T_D$, so that $T_D$ may be computed as $$T_D = \sum_{k=0}^{\frac{(M-2)}{2}} \left\{ (y_{2k} + y_{N+2k}) \prod_{i=2k+1}^{N-1+2k} (y_i) \right\} \quad (13B)$$

which is identical to equation (13A), and all the techniques developed for $T_B$ in $\Sigma$-$\Pi$ space are directly applicable to $T_D$.

Now, the complexity of equation (13A) is approximately (M-2)/2 sums of (N-2) products, or approximately (MN/2) for large values of M and N. Thus, the complexity of equation (13) is approximately half of the complexity of equation (6). The above mathematics may be simplified by a divide-and-conquer method that reuses product terms calculated for different values of k.

First, define a product term as $$P_Q(k) \prod_{i=2k+1}^{N-1+2k} (y_i) \quad (14)$$

which is a product of N-1 terms for each of k=0 to (Q-1), where Q is the number of product terms. Substituting this product term with Q=M/2 in equation 13A may be rewritten as $$T_B = \sum_{k=0}^{\frac{(M-2)}{2}} \{(y_{2k} + y_{N+2k}) \cdot P_{M/2}(k)\} \quad (15)$$

For a general m, the interim product terms for $P_m(k)$ may be defined as $$P_m(k) P_{m/2}(k) P_{m/2}(k+\log_2(m/2)) \quad (16)$$

and the basic product term is defined as $$P_2(k) \prod_{i=2k+1}^{2k+2} (y_i) \quad (17)$$

for k=0 to (Q-1).

In some embodiments, the divide and conquer technique described above may be directly applied to compute any $P_Q$, where Q is a power of 2 (such as $P_8$, $P_{16}$, etc.). For a $P_Q$, where Q is not a power of 2, Q may be split as the sum of $q_1$, $q_2$, $q_3$, ... $q_n$, where $\Sigma_{i=1}^{i=n} q_i = Q$ and each $q_i$ is a power of two. The product term $P_Q$ can be determined as the product of all the Pq terms by applying equations 16 and 17 above. For example, Q=12 may be split as 8+4 because 8 and 4 are both power of 2. Accordingly, $P_{12}$ may be determined by multiplying $P_8$ and $P_4$ to produce $P_{12}$.

For simplicity, consider the case where M=16 and N=9, so $$P_8(k) \prod_{i=2k+1}^{8+2k} (y_i) \quad (18)$$

which is the product of 8 terms for each of k=0 to 8. This product term may be rewritten using equation (16) as the product of two terms as $$P_8(k) P_4(k) P_4(k+3) \quad (19)$$

which sub-terms may also be written as a product of two terms as $$P_4(k) P_2(k) P_2(k+1) \quad (20)$$

which may be written as a product of two neighboring intensity terms $y_i$ as $$P_2(k) \prod_{i=2k+1}^{2k+2} (y_i) = y_{2k+1} \cdot y_{2k+2} \quad (21)$$

Using this divide-and-conquer technique, a product of two neighboring terms is computed once but used multiple times (e.g., $P_2(2)$ is used in both $P_4(2)$ and $P_4(1)$, which are used in $P_8(2)$, $P_8(3)$ $P_8(4)$ and $P_8(5)$). As previously described, to compute $T_B$ using equation (6) takes (M-1) times (N-1) comparison operations or approximately MN for large values of M and N. Using the divide-and-conquer technique, the number of comparison operations may be reduced based on recycling results.

Figure 12A:
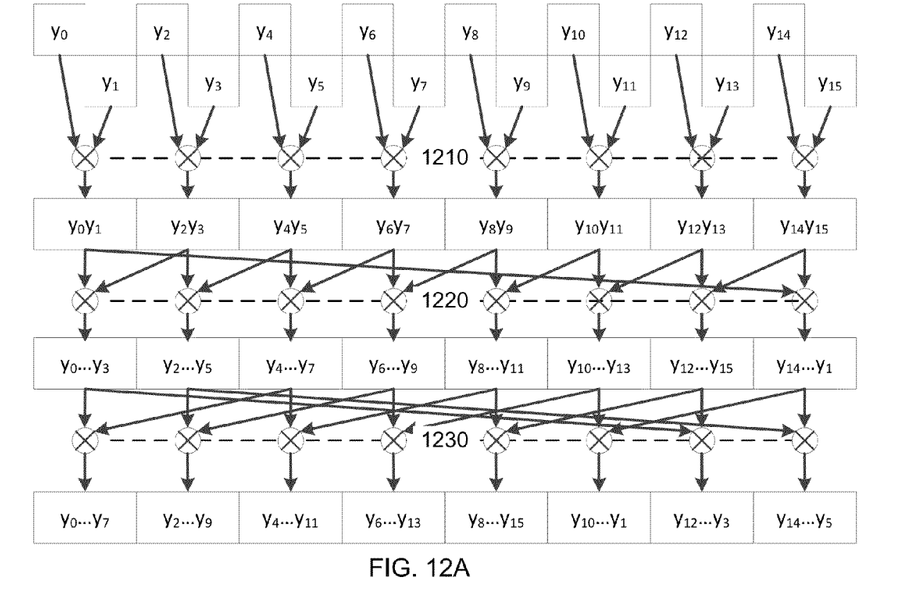
FIG. 12A shows an exemplary computation of products for the divide and conquer method for M=16 and N=9.

FIG. 12A shows an exemplary computation of products for the divide and conquer method for M=16 and N=9. As shown in FIG. 12, initially, at step 1210, products of pairs of neighboring terms $(y_0, y_1)$, $(y_2, y_3)$, $(y_4, y_5)$ ... $(y_{14}, y_{15})$ may be computed.

Next, in step 1220, by using pairs of the products obtained above additional products may be computed. For example, to calculate $y_0 \cdot y_1 \cdot y_2 \cdot y_3$, the products of $(y_0, y_1)$ and $(y_2, y_3)$, which were previously obtained in step 1210, may be used. Note that the product of $(y_0, y_1)$, which was previously obtained in step 1210, is also used in the computation of $y_{14} \cdot y_{15} \cdot y_0 \cdot y_1$.

Similarly, to compute product $y_0 \cdot y_1 \cdot y_2 \cdot y_3 \cdot y_4 \cdot y_5 \cdot y_6 \cdot y_7$, in step 1230, the products of $(y_0, y_1, y_2, y_3)$ and $(y_4, y_5, y_6, y_7)$ obtained in step 1220 may be reused and multiplied. The product of $(y_0, y_1, y_2, y_3)$ computed in step 1220 is also re-used in the computation of $y_{12} \cdot y_{13} \cdot y_{14} \cdot y_{15} \cdot y_0 \cdot y_1 \cdot y_2 \cdot y_3$ in step 1230.

Figure 12B:
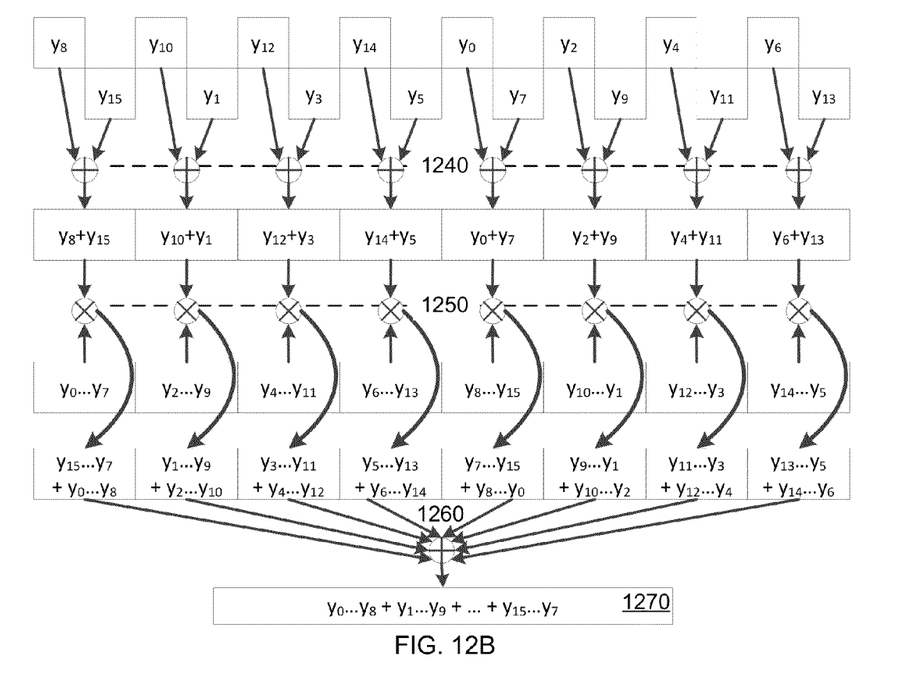
FIG. 12B shows an exemplary computation of a sum of products for the divide and conquer method for M=16 and N=9.

FIG. 12B shows an exemplary computation of a sum of products for the divide and conquer method for M=16 and N=9. As shown in FIG. 12B, initially, in step 1240, sums of pairs for $(y_8, y_{15})$, $(y_{10}, y_1)$, $(y_{12}, y_3)$, $(y_{14}, y_5)$, $(y_0, y_7)$, $(y_2, y_9)$, $(y_4, y_{11})$, $(y_6, y_{13})$ may be computed.

Next, in step 1250, the sums of pairs obtained above, in step 1240, may be multiplied with the products computed in step 1230. For example, in step 1250, $(y_0 \cdot y_1 \cdot y_2 \cdot y_3 \cdot y_4 \cdot y_5 \cdot y_6 \cdot y_7)$ computed in step 1230 may be multiplied with $(y_8 + y_{15})$ computed in step 1240 to obtain the sum of products $(y_0 \cdot y_1 \cdot y_2 \cdot y_3 \cdot y_4 \cdot y_5 \cdot y_6 \cdot y_7 \cdot y_8) + (y_{15} \cdot y_0 \cdot y_1 \cdot y_2 \cdot y_3 \cdot y_4 \cdot y_5 \cdot y_6 \cdot y_7)$. Similarly, the product of $(y_2 \cdot y_3 \cdot y_4 \cdot y_5 \cdot y_6 \cdot y_7 \cdot y_8 \cdot y_9)$ computed in step 1230 may be reused and multiplied with $(y_{10} + y_1)$ computed in step 1240 to obtain the sum of products $(y_0 \cdot y_1 \cdot y_2 \cdot y_3 \cdot y_4 \cdot y_5 \cdot y_6 \cdot y_7 \cdot y_8 \cdot y_9) + (y_2 \cdot y_3 \cdot y_4 \cdot y_5 \cdot y_6 \cdot y_7 \cdot y_8 \cdot y_9 \cdot y_{10})$.

The various sums of products computed in step 1250 are then added in step 1260 to yield the eventual result 1270. By recycling results, the divide-and-conquer technique may reduce the number of addition and multiplication operations performed.

Using inverse conversion properties, equation (13A) is converted from $\Sigma$-$\Pi$ space back to Max-Min space. Equation (13A) is rewritten in Max-Min space in reduced-complexity form as $$T_B = \max_{k=0}^{(M-2)/2} \{\min_{i=2k+1}^{N-1+2k} [\max(y_{2k}, y_{N+2k}), y_i]\}. \quad (22A)$$

Similarly, equation (13B) is converted from $\Sigma$-$\Pi$ space back to Min-Max space. Equation (13B) is rewritten in Min-Max space in reduced-complexity form as:

$$T_B = \max_{k=0}^{(M-2)/2} \{\min_{i=2k+1}^{N-1+2k} [\max(y_{2k}, y_{N+2k}), y_i]\}. \quad (22A)$$

Using the above-described method, one is able to calculate the corner strength (referred to as a threshold score S)

directly. In contrast, prior art methods search iteratively for a threshold. In some embodiments, hardware, software, and/or a combination of hardware and software may be used to implement the method described above.

Previous if-then-else decision trees may be replaced with min-max operations as shown above. As a results, the prior art iterative search to find a threshold, where an if-then-else decision tree is invoked several times, may be replaced with a set of min-max operations. That is, the prior art only uses a compare operation for threshold testing but never uses min-max operations within the decision tree. Using the method described above, one effectively turns the decision tree and iterative search into a simple set of min-max operations. The complicated min-max operations may be replaced with the divide-and-conquer technique to reduce a number of overall operations, reduce latency and speed processing.

Figure 13:
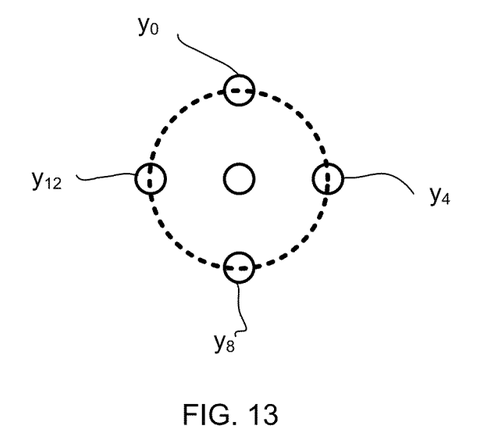
FIG. 13 shows example test pixels used for pre-processing of an image, in accordance with some embodiments of the present invention.

FIG. 13 shows exemplary test pixels with intensities $y_0$, $y_4$, $y_8$ and $y_{12}$, which may be used for pre-processing an image. In some embodiments, test pixels, such as the exemplary pixels $y_0$, $y_4$, $y_8$ and $y_{12}$ shown in FIG. 13, may be used to exclude a number of pixel positions as potential corner pixels, thereby resulting in a plurality of candidate corners.

In the FAST algorithm, for a center pixel with intensity x to be a corner, the intensity of at least N consecutive pixels $y_k \ldots y_{k+N-1}$ in a set $A_k$ differ from x by threshold t. Therefore, by selecting a set of pixels P such that at least one of the pixels in the set P is in every set $A_k$, $0 \le k \le M-1$, and determining that the intensities of each pixel in set P differ from x by less than threshold t, the pixel position corresponding to the center pixel can be eliminated as a potential corner pixel. In some embodiments, a minimal set of pixels P such that at least one of the pixels in the set P is in every set $A_k$, $\le k \le M-1$, may be selected for use in a pre-processing step.

In FIG. 13, for M=16 and N=9, the set P may be comprised of exemplary test pixels $y_0$, $y_4$, $y_8$ and $y_{12}$. At least one of pixels $y_0$, $y_4$, $y_8$ and $y_{12}$ is in every set $A_k$, $0 \le k \le 15$. Therefore, if the difference between center pixel x and each of $y_0$, $y_4$, $y_8$ and $y_{12}$ is less than t, then no set $A_k$, $0 \le k \le 15$ can have N consecutive pixels that differ in intensity from center pixel by more than threshold t. Accordingly, the center pixel can be excluded as a possible corner pixel. In some embodiments, an initial value of t may be chosen based on heuristics to eliminate one or more pixel positions as potential corner pixels during a pre-processing step.

In some embodiments, the FAST algorithm may be used for pre-processing. For example, for M=16 and N=9. Consider pixels $y_0$, $y_4$, $y_8$ and $y_{12}$ for use in pre-processing. Pixels $y_0$, $y_4$, $y_8$ and $y_{12}$ can be considered as forming a new ring with N=9. If the center pixel is to be a corner candidate for the new ring, then at least 2 pixels in the new ring differ in intensity from the center pixel by more than threshold t. Therefore, we can consider this to be another FAST algorithm, where M'=4 (4 pixels on the ring) and N'=2 (at least 2 pixels satisfying threshold test).

Figure 14:
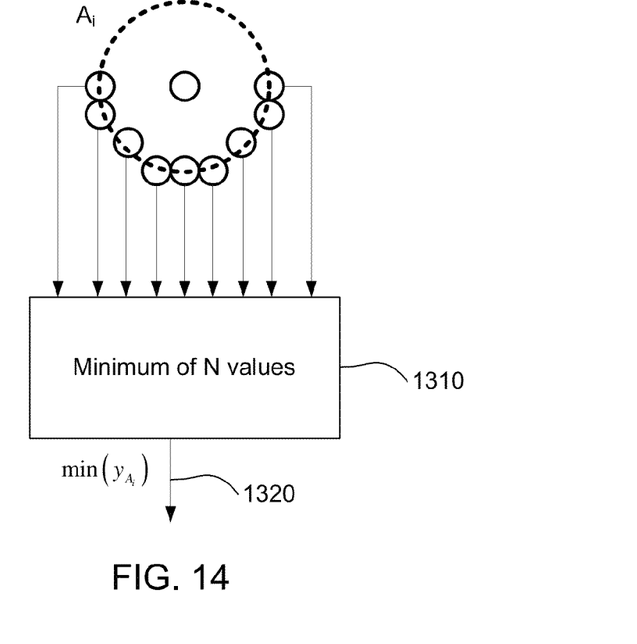
FIGS. 14 and 15 show hardware to compute minimums and maximums of a segment of pixel intensities, in accordance with some embodiments of the present invention.
Figure 15:
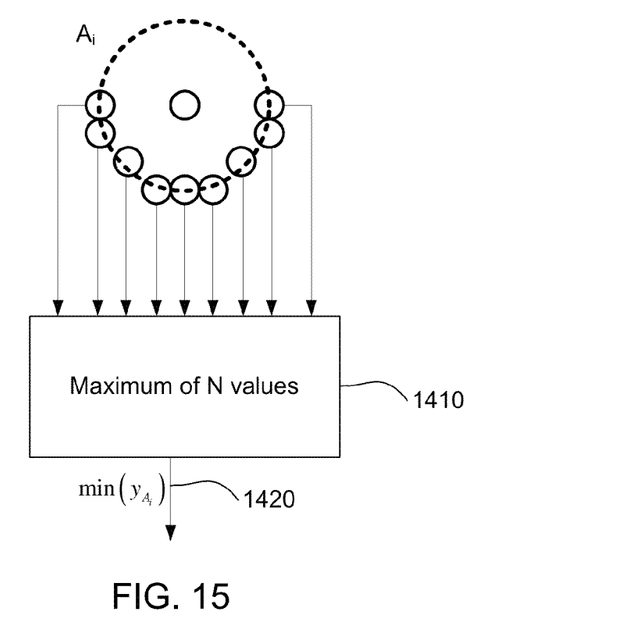

FIGS. 14 and 15 show hardware to compute minimums and maximums of a segment of pixel intensities, respectively.

As shown in FIG. 14, the brightness values of individual pixels in a set $A_i$ comprising N consecutive pixels on a ring of M pixels may be input to hardware 1310, which may compute and output the minimum of the N values 1320.

Similarly, as shown in FIG. 15, the brightness values of individual pixels in a set $A_i$ comprising N consecutive pixels on a ring of M pixels may be input to hardware 1410, which may compute and output the maximum of the N values 1420.

In some embodiments, hardware to compute the minimums and/or maximums may include Arithmetic Logic Units (ALUs), Field Programmable Gate Arrays (FPGA's), Application Specific Integrated Circuits (ASICs), and/or other hardware circuitry configured to implement the described method. In some embodiments, the hardware may take the form of an integrated circuit (IC) comprising, multi-bit comparators multiplexers, and/or adders/multipliers, and/or other logic elements. In some embodiments, hardware 1310 and 1410 to compute the minimums and/or maximums may be designed using off the shelf components in a manner consistent with disclosed embodiments.

In some embodiments, M instances of hardware 1310 may be utilized, for example, by using one instance of hardware 1310 per set $A_i$, where $0 \le i \le M-1$, to determine the minimum of the brightness values of N individual pixels in parallel for each of the sets $A_i$. Similarly, M instances of hardware 1410 may be utilized, for example, by using one instance of hardware 1410 per set $A_i$, where $0 \le i \le M-1$, to determine the maximum of the brightness values of N individual pixels in parallel for each of the sets $A_i$. In some embodiments, one or more instances of hardware 1310 and 1410 may be used in a pipelined fashion to determine the minimum and maximum of the brightness values of individual pixels in parallel for each of the sets $A_i$.

Figure 16:
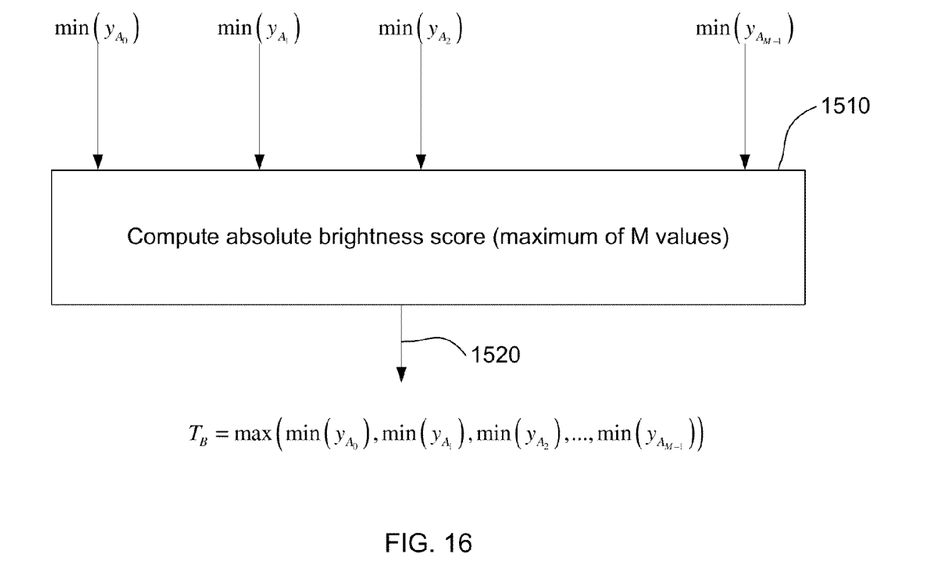
FIGS. 16 and 17 show hardware to compute a brightness score ($T_B$) and a darkness score ($T_D$), in accordance with some embodiments of the present invention.
Figure 17:
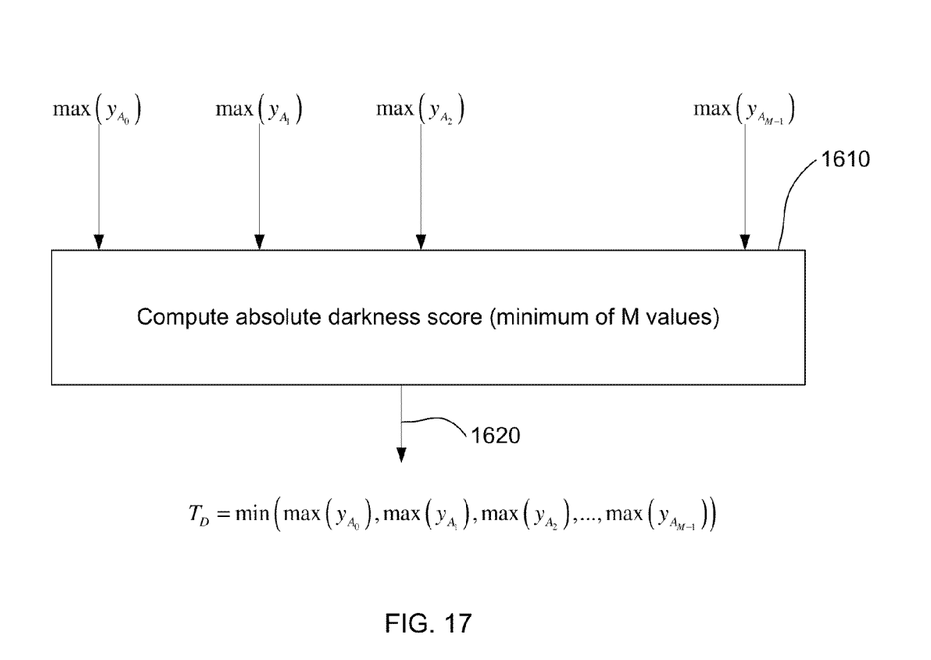

FIGS. 16 and 17 show hardware to compute a brightness score ($T_B$) and a darkness score ($T_D$), respectively.

As shown in FIG. 16, the minimum of the brightness values $\min(y_{A_i})$ of individual pixel sets $A_i$ for $0 \le i \le M-1$ may be input to hardware 1510, which may then compute and output the maximum 1520 of the M input values.

Similarly, as shown in FIG. 17, the maximum of the brightness values $\max(y_{A_i})$ of individual pixel sets $A_i$ for $0 \le i \le M-1$ may be input to hardware 1610, which may then compute and output the minimum 1620 of the M input values.

In some embodiments, input to hardware 1510 may be output 1320 of hardware 1310, for each set $A_i$ for $0 \le i \le M-1$. Similarly, the input to hardware 1610 may be output 1420 of hardware 1410, for each set $A_i$ for $0 \le i \le M-1$. For example, in a parallel implementation, the outputs 1320 and 1420 of the M instances of hardware 1310 and 1410 may be fed as input to hardware 1610 and 1710, respectively. In some embodiments, the described method may permit the use of a reconfigurable and reusable design. That is, the circuitry for computing $T_B$ may also be used to calculate $T_D$, as explained further below.

Figure 18:
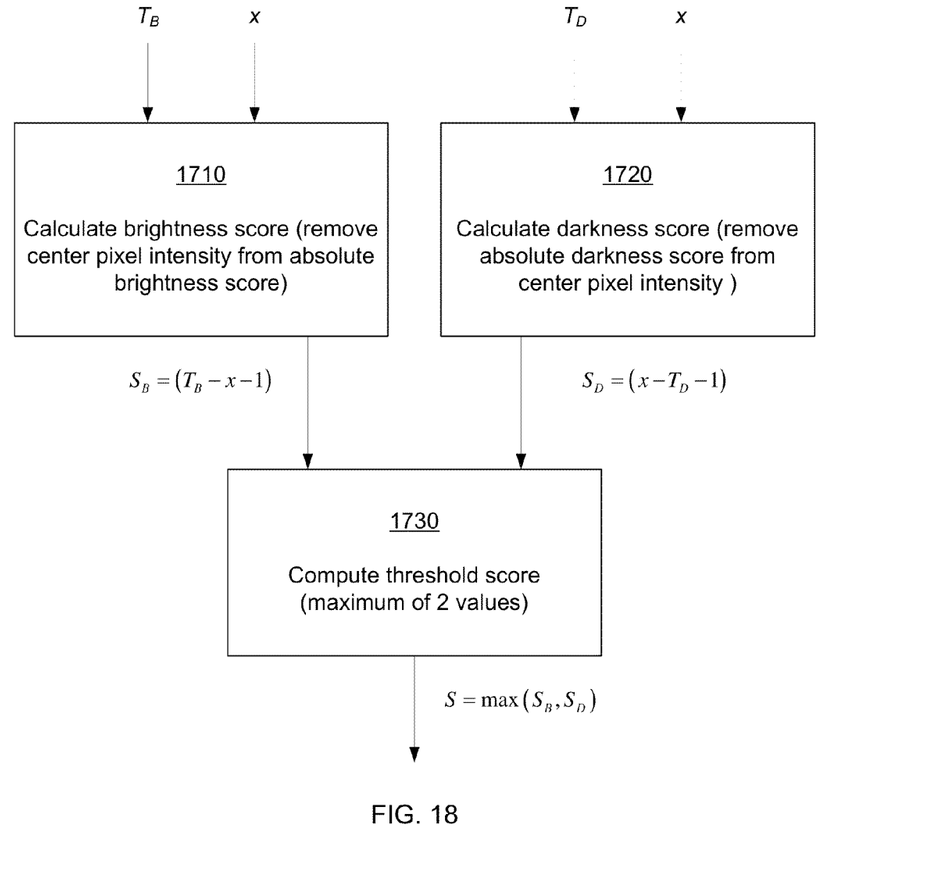
FIG. 18 shows a method for computing a threshold score (S) from the brightness score ($T_B$) and darkness score ($T_D$), in accordance with some embodiments of the present invention.

FIG. 18 shows a method for computing a threshold score (S) from the absolute brightness score ($T_B$) and absolute darkness score ($T_D$). As shown in FIG. 18, in some embodiments, in step 1710, a brightness score $S_B$ may be calculated using equations (3A) and (3B) by subtracting the intensity x of center pixel 120 from $T_B$. In step 1720, a darkness score $S_D$ may be calculated by subtracting $T_D$ from the intensity x of center pixel 120. In some embodiments, steps 1710 and 1720 may be performed in parallel. Next, in step 1730, the threshold score S may be calculated using equation (2) as the maximum of brightness score $S_B$ and darkness score $S_D$.

Figure 19:
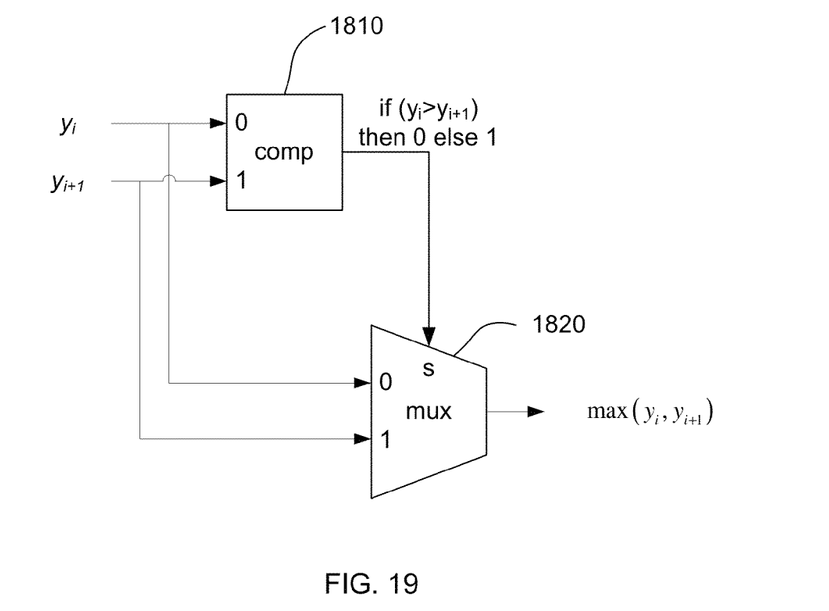
FIGS. 19 and 20 show hardware for computing maximum and minimum values, in accordance with some embodiments of the present invention.
Figure 20:
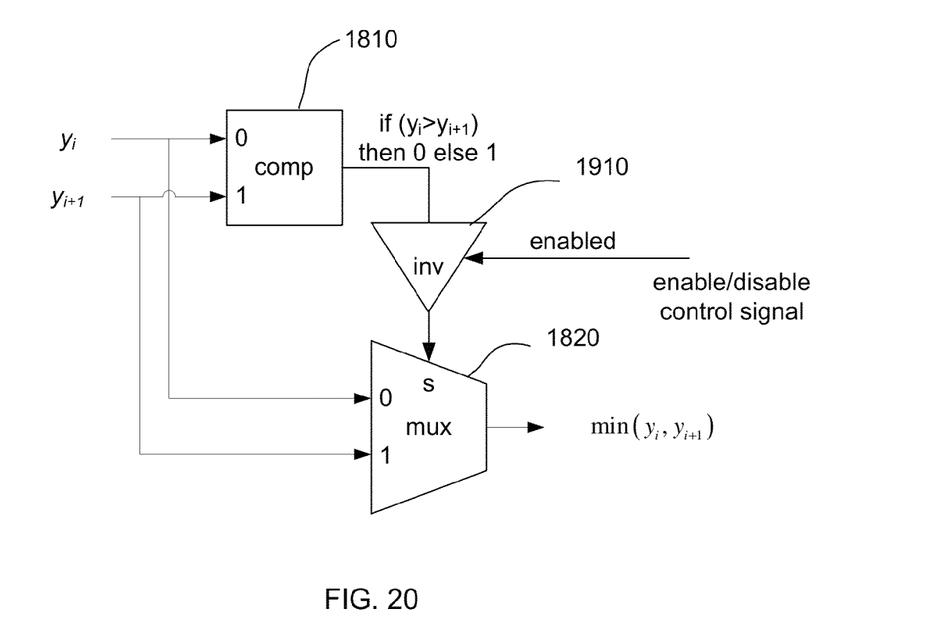

FIGS. 19 and 20 show exemplary hardware for computing maximum and minimum values in a manner consistent with disclosed embodiments. The described method enables a reconfigurable and reusable design. That is, the circuitry for computing $T_B$ may also be used to calculate $T_D$, by inverting the signal into the select input of multiplexer (mux) 1820 as shown in FIGS. 19 and 20.

In FIG. 19, a maximum operation for two inputs ($y_i$, $y_{i+1}$) is shown. Comparator 1810 provides a '0' to a select input of mux 1820 if an input ($y_i$) at port '0' is larger than an input ($y_{i+1}$) at port '1'. On the other hand, if the input at port '0' is not larger than the input at port '1', comparator 1810 provides a '1' at the select input of the mux 1820.

In FIG. 20, a minimum operation for two inputs ($y_i$, $y_{i+1}$) is shown. Inverter 1910 toggles the output of comparator 1810 thus providing a toggled input to the selector of mux 1820. Inverter 1910 may be programmable or otherwise configurable using enable/disable control signal, which may disable or enable inverter 1910, thus giving either a maximum operator or a minimum operator. In this manner, the same circuitry may be used for computing both $T_B$ and $T_D$. The brightness score $T_B$ is computed using the appropriate maximum and minimum operators as shown in equation 22A. The darkness score $T_D$ may then be computed with the same circuitry (in accordance with equation 22B) once an enabled/disable control signal has been toggled so that the maximum operators become and minimum operators and vice versa. This kind of configurability and reusability is not possible in the prior art.

This re-configurability extends beyond calculating threshold scores with maximum and minimum operators. For example, equations 23A through 25 below define criteria for FAST corner detection in Boolean algebra. Equations 22A and 22B are similar in structure to equations 24A and 24B, respectively. Therefore, any implementation of equation 22A can be reconfigured to implement equation 24A. A system may be implemented simply by changing all inputs from $y_i$ to $L_i$, minimum operators to Boolean "AND" operators, and maximum operators to Boolean "OR" operators. Similarly, it is also straightforward to convert implementation of equation 22B to equation 24B.

$$L_i \begin{cases} 1 & \text{if } y_i < x - t \\ 0 & \text{otherwise} \end{cases} \quad (23A)$$

$$G_i \begin{cases} 1 & \text{if } y_i > x + t \\ 0 & \text{otherwise} \end{cases} \quad (23B)$$

$$C_B \; OR(AND(L_{A_0}), AND(L_{A_1}), \ldots, AND(L_{A_{M-1}})) \quad (24A)$$

$$C_D \; OR(AND(G_{A_0}), AND(G_{A_1}), \ldots, AND(G_{A_{M-1}})) \quad (24B)$$

$$\text{center pixel} \begin{cases} \text{bright corner} & \text{if } C_B = 1 \\ \text{dark corner} & \text{if } C_D = 1 \\ \text{not a corner} & \text{otherwise} \end{cases} \quad (25)$$

Figure 21:
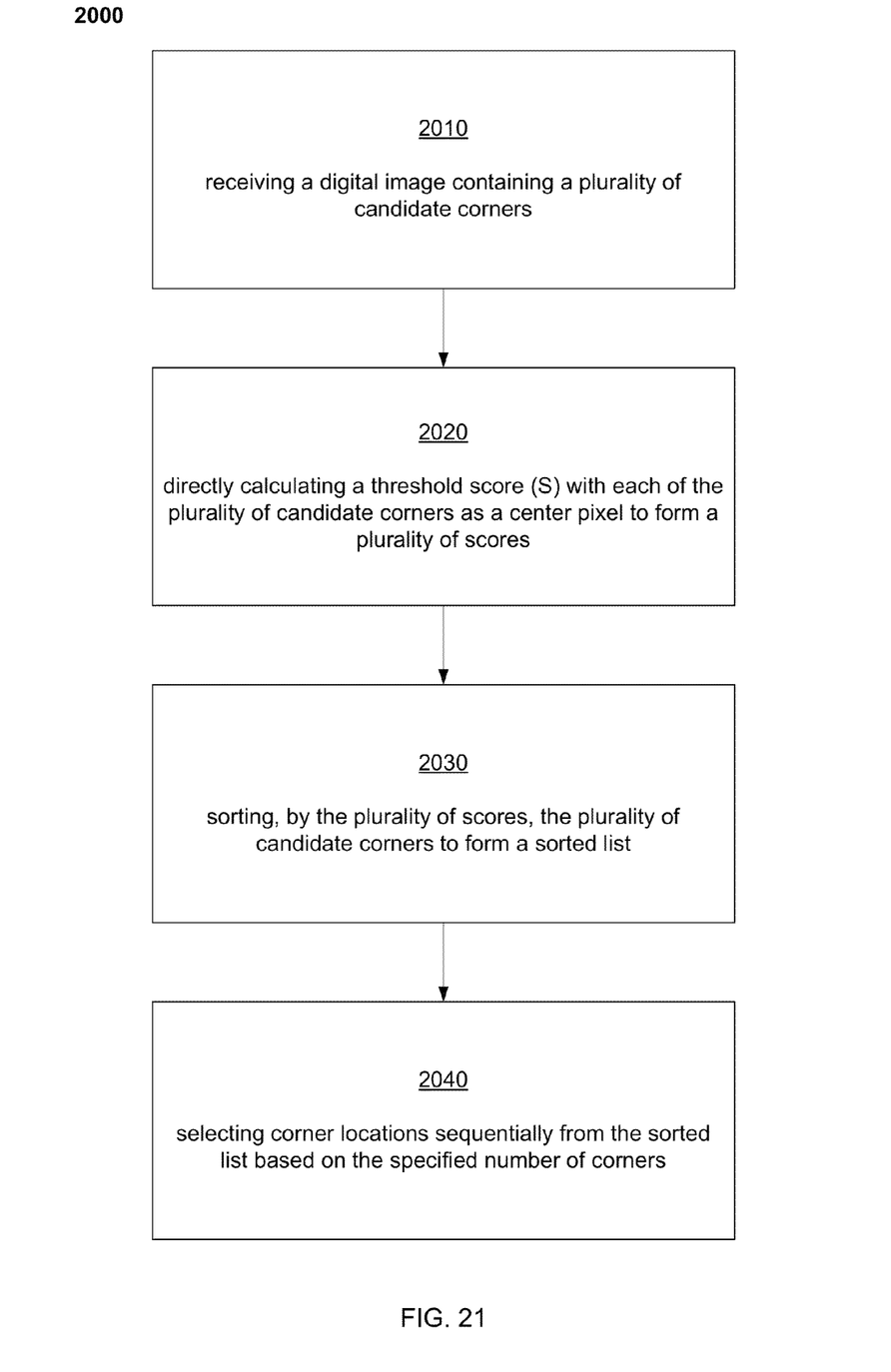
FIG. 21 shows a method for finding a certain number of corners in an image, in accordance with some embodiments of the present invention.

FIG. 21 shows a flowchart with steps in an exemplary method 2000 for finding a specified number of corners in an image. In step 2010, a digital image with one or more candidate corners may be accessed or received by method 2000. In some embodiments, candidate corners may be determined by pre-processing a raw digital image to exclude a number of pixel positions as potential corner pixels, thereby resulting in a plurality of candidate corners. For example, as shown in FIG. 13, exemplary test pixels with intensities $y_0$, $y_4$, $y_8$ and $y_{12}$, may be used for pre-processing the digital image.

Next, in step 2020, a threshold score S may be directly calculated by treating each of the candidate corners as a center pixel and thereby obtaining a plurality of scores corresponding to the plurality of corners. In some embodiments, the exemplary method discussed above may be used to directly calculate $T_B$, $T_D$, $S_B$, $S_D$ and S for the plurality of corners using equations 22A, 22B, 3A, 3B and 2, respectively.

In step 2030, the plurality of corners may be sorted in decreasing order of scores to form a sorted list. In some embodiments, various other data structures may be used to maintain an ordered sequence of corners, ranked in decreasing order of score.

In step 2040, corner locations may be selected in order from the sorted sequence of corners based on the number of corners specified.

The methodologies described herein may be implemented by various means depending upon the application. For example, these methodologies may be implemented in hardware, firmware, software, or any combination thereof. For a hardware implementation, the processing units may be implemented within one or more ASICs, digital signal processors (DSPs), digital signal processing devices (DSPDs), programmable logic devices (PLDs), FPGAs, processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, solid sate drives, flash drives, memory cards, or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method to find a specified number of corners in a digital image, the method comprising:
    receiving the digital image containing a plurality of candidate corners;
    calculating a threshold score (S) comprising a maximum of a brightness score ($S_B$) and a darkness score ($S_D$), using a set of non-iterative min-max operations, for each of a plurality of center pixels to form a plurality of scores, wherein each center pixel corresponds to a distinct individual candidate corner in the plurality of candidate corners, wherein for each candidate corner:
        the threshold score (S) comprises a maximum of a brightness score ($S_B$) and a darkness score ($S_D$);
        the brightness score ($S_B$) and the darkness score ($S_D$) each comprises a difference between an intensity of pixels; and
        the intensity of pixels comprises a minimum intensity, for the brightness score ($S_B$), or a maximum intensity, for the darkness score ($S_D$), of intensities of the pixels;
    sorting, by the plurality of scores, the plurality of candidate corners to form a sorted list; and
    selecting corner locations sequentially from the sorted list based on the specified number of corners.

2. The method of claim 1, further comprising excluding a number of pixel positions as possible corner pixels, thereby forming the plurality of candidate corners.

3. The method of claim 2, wherein excluding the number of pixel positions comprises determining, for each excluded pixel position, whether N consecutive pixels forming at least part of a ring of M pixels around a center pixel corresponding to the excluded pixel position can be neither all brighter nor all darker than the center pixel.

4. The method of claim 1, wherein for each candidate corner:
    the difference between the intensity comprises an intensity x of a center pixel corresponding to the candidate corner and an intensity of N consecutive pixels on a ring about the center pixel; and
    the N consecutive pixels form at least part of a ring of M pixels around the center pixel; and
    the intensity of the N consecutive pixels comprises the minimum intensity, for the brightness score ($S_B$), or the maximum intensity, for the darkness score ($S_D$), of intensities of the N consecutive pixels.

5. The method of claim 4, wherein, in forming the threshold score (S), at least one pixel intensity in the N consecutive pixels is greater than and at least one other pixel intensity in the N consecutive pixels is less than the intensity of the center pixel, for at least one of the plurality of scores.

6. The method of claim 4, wherein $y_i$ is the intensity of an i-th pixel on the ring of M pixels, where $y_{i+M}=y_i$, and wherein an absolute brightness score $T_B$ and an absolute darkness score $T_D$ are calculated as:

$$T_B = \max_{k=0}^{(M-2)/2} \{\min_{i=2k+1}^{N-1+2k}[\max(y_{2k},y_{N+2k}),y_i]\}; \text{ and}$$

$$T_D = \min_{k=0}^{(M-2)/2} \{\max_{i=2k+1}^{N-1+2k}[\min(y_{2k},y_{N+2k}),y_i]\}$$

for $i=0$ to $M-1$, and where k represents an index.

7. The method of claim 4, wherein M is 16 and N is between 9 and 12.

8. The method of claim 6, wherein:
    the brightness score ($S_B$) is calculated as $S_B=(T_B-x-1)$; and
    the darkness score ($S_D$) is calculated as $S_D=(x-T_D-1)$.

9. The method of claim 1, wherein calculating the threshold score (S) for each of the plurality of center pixels are performed in parallel.

10. A device to find a certain number of corners in a digital image, the device comprising:
    means for receiving the digital image containing a plurality of candidate corners;
    means for calculating a threshold score (S) comprising a maximum of a brightness score ($S_B$) and a darkness score ($S_D$), using a set of non-iterative min-max operations, for each of a plurality of center pixels to form a plurality of scores, wherein each center pixel corresponds to a distinct individual candidate corner in the plurality of candidate corners, wherein for each candidate corner:
        the threshold score (S) comprises a maximum of a brightness score ($S_B$) and a darkness score ($S_D$);
        the brightness score ($S_B$) and the darkness score ($S_D$) each comprises a difference between an intensity of pixels; and
        the intensity of pixels comprises a minimum intensity, for the brightness score ($S_B$), or a maximum intensity, for the darkness score ($S_D$), of intensities of the pixels;
    means for sorting, by the plurality of scores, the plurality of candidate corners to form a sorted list; and
    means for selecting corner locations sequentially from the sorted list based on the certain number of corners.

11. The device of claim 10, further comprising means for excluding a number of pixel positions as possible corner pixels, thereby forming the plurality of candidate corners.

12. The device of claim 11, wherein the means for excluding the number of pixel positions comprises determining, for each excluded pixel position, whether N consecutive pixels forming at least part of a ring of M pixels around a center pixel corresponding to the excluded pixel position can be neither all brighter nor all darker than the center pixel.

13. The device of claim 10, wherein for each candidate corner:
    the difference between the intensity comprises an intensity x of a center pixel corresponding to the candidate corner and an intensity of N consecutive pixels on a ring about the center pixel; and
    the N consecutive pixels form at least part of a ring of M pixels around the center pixel; and
    the intensity of the N consecutive pixels comprises the minimum intensity, for the brightness score ($S_B$), or the maximum intensity, for the darkness score ($S_D$), of intensities of the N consecutive pixels.

14. The device of claim 13, wherein, in forming the threshold score (S), at least one pixel intensity in the N consecutive pixels is greater than and at least one other pixel intensity in the N consecutive pixels is less than the intensity of the center pixel, for at least one of the plurality of scores.

15. The device of claim 13, wherein $y_i$ is the intensity of an i-th pixel on the ring of M pixels, where $y_{i+M}=y_i$, and wherein an absolute brightness score $T_B$ and an absolute darkness score $T_D$ are calculated as:

$$T_B = \max_{k=0}^{(M-2)/2} \{\min_{i=2k+1}^{N-1+2k}[\max(y_{2k},y_{N+2k}),y_i]\}; \text{ and}$$

$$T_D = \min_{k=0}^{(M-2)/2} \{\max_{i=2k+1}^{N-1+2k}[\min(y_{2k},y_{N+2k}),y_i]\}$$

for $i=0$ to $M-1$, and where k represents an index.

16. The device of claim 12, wherein M is 16 and N is between 9 and 12.

17. The device of claim 15, wherein:
    the brightness score ($S_B$) is calculated as $S_B=(T_B-x-1)$; and
    the darkness score ($S_D$) is calculated as $S_D=(x-T_D-1)$.

18. A device comprising at least one processor and a memory wherein the memory includes software instructions for a method to find a specified number of corners in a digital image, the method comprising:
- receiving a digital image containing a plurality of candidate corners;
- calculating a threshold score (S) comprising a maximum of a brightness score ($S_B$) and a darkness score ($S_D$), using a set of non-iterative min-max operations, for each of a plurality of center pixels to form a plurality of scores, wherein each center pixel corresponds to a distinct individual candidate corner in the plurality of candidate corners, wherein for each candidate corner:
  - the threshold score (S) comprises a maximum of a brightness score ($S_B$) and a darkness score ($S_D$);
  - the brightness score ($S_B$) and the darkness score ($S_D$) each comprises a difference between an intensity of pixels; and
  - the intensity of pixels comprises a minimum intensity, for the brightness score ($S_B$), or a maximum intensity, for the darkness score ($S_D$), of intensities of the pixels;
- sorting, by the plurality of scores, the plurality of candidate corners to form a sorted list; and
- selecting corner locations sequentially from the sorted list based on the specified number of corners.

19. The device of claim 18, wherein the software instructions further comprise instructions for excluding a number of pixel positions as possible corner pixels, thereby forming the plurality of candidate corners.

20. The device of claim 19, wherein the instructions for excluding the number of pixel positions comprises determining, for each excluded pixel position, whether N consecutive pixels forming at least part of a ring of M pixels around a center pixel corresponding to the excluded pixel position can be neither all brighter nor all darker than the center pixel.

21. The device of claim 18, wherein for each candidate corner:
- the difference between the intensity comprises an intensity x of a center pixel corresponding to the candidate corner and an intensity of N consecutive pixels on a ring about the center pixel; and
- the N consecutive pixels form at least part of a ring of M pixels around the center pixel; and
- the intensity of the N consecutive pixels comprises the minimum intensity, for the brightness score ($S_B$), or the maximum intensity, for the darkness score ($S_D$), of intensities of the N consecutive pixels.

22. The device of claim 21, wherein $y_i$ is the intensity of an i-th pixel on the ring of M pixels, where $y_{i+M}=y_i$, and wherein an absolute brightness score $T_B$ and an absolute darkness score $T_D$ are calculated as:

$$T_B = \max_{k=0}^{(M-2)/2}\{\min_{i=2k+1}^{N-1+2k}[\max(y_{2k},y_{N+2k}),y_i]\}; \text{ and}$$

$$T_D = \min_{k=0}^{(M-2)/2}\{\max_{i=2k+1}^{N-1+2k}[\min(y_{2k},y_{N+2k}),y_i]\}$$

for $i=0$ to $M-1$, and where $k$ represents an index.

23. The device of claim 21, wherein M is 16 and N is between 9 and 12.

24. The device of claim 22, wherein:
- the brightness score ($S_B$) is calculated as $S_B=(T_B-x-1)$; and
- the darkness score ($S_D$) is calculated as $S_D=(x-T_D-1)$.

25. A non-transitory computer-readable medium including program code stored thereon, comprising program code for a method to find a specified number of corners in a digital image, the method comprising:
- receiving a digital image containing a plurality of candidate corners;
- calculating a threshold score (S) comprising a maximum of a brightness score ($S_B$) and a darkness score ($S_D$), using a set of non-iterative min-max operations, for each of a plurality of center pixels to form a plurality of scores, wherein each center pixel corresponds to a distinct individual candidate corner in the plurality of candidate corners, wherein for each candidate corner:
  - the threshold score (S) comprises a maximum of a brightness score ($S_B$) and a darkness score ($S_D$);
  - the brightness score ($S_B$) and the darkness score ($S_D$) each comprises a difference between an intensity of pixels; and
  - the intensity of pixels comprises a minimum intensity, for the brightness score ($S_B$), or a maximum intensity, for the darkness score ($S_D$), of intensities of the pixels;
- sorting, by the plurality of scores, the plurality of candidate corners to form a sorted list; and
- selecting corner locations sequentially from the sorted list based on the specified number of corners.

26. The non-transitory computer-readable medium of claim 25, further comprising program code for excluding a number of pixel positions as possible corner pixels, thereby forming the plurality of candidate corners.

27. The non-transitory computer-readable medium of claim 26, wherein excluding the number of pixel positions comprises determining, for each excluded pixel position, whether N consecutive pixels forming at least part of a ring of M pixels around a center pixel corresponding to the excluded pixel position can be neither all brighter nor all darker than the center pixel.

28. The non-transitory computer-readable medium of claim 25, wherein for each candidate corner:
- the difference between the intensity comprises an intensity x of a center pixel corresponding to the candidate corner and an intensity of N consecutive pixels on a ring about the center pixel; and
- the N consecutive pixels form at least part of a ring of M pixels around the center pixel; and
- the intensity of the N consecutive pixels comprises the minimum intensity, for the brightness score ($S_B$), or the maximum intensity, for the darkness score ($S_D$), of intensities of the N consecutive pixels.

29. The non-transitory computer-readable medium of claim 28, wherein $y_i$ is the intensity of an i-th pixel on the ring of M pixels, where $y_{i+M}=y_i$, and wherein an absolute brightness score $T_B$ and an absolute darkness score $T_D$ are calculated as:

$$T_B = \max_{k=0}^{(M-2)/2}\{\min_{i=2k+1}^{N-1+2k}[\max(y_{2k},y_{N+2k}),y_i]\}; \text{ and}$$

$$T_D = \min_{k=0}^{(M-2)/2}\{\max_{i=2k+1}^{N-1+2k}[\min(y_{2k},y_{N+2k}),y_i]\}$$

for $i=0$ to $M-1$, and where $k$ represents an index.

30. The non-transitory computer-readable medium of claim 28, wherein M is 16 and N is between 9 and 12.

31. The non-transitory computer-readable medium of claim 29, wherein:
- the brightness score ($S_B$) is calculated as $S_B=(T_B-x-1)$; and
- the darkness score ($S_D$) is calculated as $S_D=(x-T_D-1)$.

* * * * *